United States Patent
Jiang et al.

(10) Patent No.: US 11,645,279 B2
(45) Date of Patent: May 9, 2023

(54) INDEX SELECTION FOR DATABASE QUERY

(71) Applicant: International Business Machines Corporation, Armonk, NY (US)

(72) Inventors: Peng Hui Jiang, Beijing (CN); Sheng Yan Sun, Beijing (CN); Shuo Li, Beijing (CN); Xiaobo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 16/998,053

(22) Filed: Aug. 20, 2020

(65) Prior Publication Data
US 2022/0058195 A1 Feb. 24, 2022

(51) Int. Cl.
*G06F 16/30* (2019.01)
*G06F 16/2453* (2019.01)
*G06F 16/22* (2019.01)

(52) U.S. Cl.
CPC ........ *G06F 16/24539* (2019.01); *G06F 16/22* (2019.01)

(58) Field of Classification Search
CPC .. G06F 16/2453; G06F 16/22; G06F 16/9024; G06F 16/951; G06F 16/242
USPC ........ 707/609, 687, 705, 769, 790, 813, 821
See application file for complete search history.

(56) References Cited

U.S. PATENT DOCUMENTS

| | | | | |
|---|---|---|---|---|
| 10,331,402 | B1* | 6/2019 | Spector | G10L 15/1815 |
| 10,885,009 | B1* | 1/2021 | Anghel | G06F 16/2315 |
| 2011/0282892 | A1* | 11/2011 | Castellani | G06F 16/242 |
| | | | | 707/766 |
| 2014/0172914 | A1* | 6/2014 | Elnikety | G06F 16/9024 |
| | | | | 707/774 |

(Continued)

FOREIGN PATENT DOCUMENTS

| | | |
|---|---|---|
| CN | 107315775 A | 11/2017 |
| WO | 2018122269 A1 | 7/2018 |

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Sana A Al-Hashemi
(74) *Attorney, Agent, or Firm* — Randy Tejeda (57) ABSTRACT

One or more computer processors match a query pattern to a received query; context information related to the received query; retrieve a set of query records including the same context information as the obtained context information from an index knowledge base, wherein each query record in the set of query records include context information related to a respective history query, the query pattern, an index type associated with the query pattern, and performance information relating to the query pattern and the index type; determine that a subset of the retrieved query records includes one or more query patterns equivalent to the matched query pattern; select a query pattern and an associated index type from the subset of query records based on associated performance information in the set of query records; and perform the received query by applying the selected query pattern and the associated index type.

20 Claims, 6 Drawing Sheets

(56) References Cited

U.S. PATENT DOCUMENTS

| | | | |
|---|---|---|---|
| 2015/0286873 A1* | 10/2015 | Davis | G06F 1/1694 |
| | | | 382/103 |
| 2016/0125004 A1 | 5/2016 | Chen | |
| 2017/0147834 A1* | 5/2017 | Bendersky | G06F 21/6245 |
| 2019/0034767 A1 | 1/2019 | Sainani | |

* cited by examiner

502 MATCH A FIRST QUERY PATTERN TO A RECEIVED QUERY TO A DATABASE,

↓

504 OBTAIN CONTEXT INFORMATION RELATED TO THE RECEIVED QUERY

↓

506 RETRIEVE A FIRST NUMBER OF QUERY RECORDS INCLUDING THE CONTEXT INFORMATION FROM QUERY RECORDS

↓

508 IN RESPONSE TO DETERMINING THAT A SECOND NUMBER OF QUERY RECORDS IN THE FIRST NUMBER OF QUERY RECORDS INCLUDE ONE OR MORE QUERY PATTERNS EQUIVALENT WITH THE QUERY PATTERN, OBTAIN THE SECOND NUMBER OF QUERY RECORDS

↓

510 SELECT A DATA PAIR FROM THE SECOND NUMBER OF QUERY RECORDS

↓

512 PERFORM THE RECEIVED QUERY USING THE SELECTED DATA PAIR

602 OBTAIN CONTEXT INFORMATION RELATED TO A HISTORY QUERY AND A DATA PAIR RELATED TO THE HISTORY QUERY AND PERFORMANCE INFORMATION RELATED TO THE DATA PAIR

↓

604 CREATE A QUERY RECORD INCLUDING THE CONTEXT INFORMATION RELATED TO THE HISTORY QUERY AND A DATA PAIR RELATED TO THE HISTORY QUERY AND PERFORMANCE INFORMATION RELATED TO THE DATA PAIR

↓

606 CREATE AT LEAST ONE QUERY RECORD INCLUDING THE CONTEXT INFORMATION RELATED TO THE HISTORY QUERY AND AT LEAST ONE DATA PAIR COMPRISED OF THE AT LEAST ONE EQUIVALENT QUERY PATTERN AND THE CORRESPONDING AT LEAST ONE INDEX TYPE AND PERFORMANCE INFORMATION RELATED TO THE AT LEAST ONE DATA PAIR

↓

608 CREATE AT LEAST ONE QUERY RECORD INCLUDING THE CONTEXT INFORMATION RELATED TO THE HISTORY QUERY AND AT LEAST ONE DATA PAIR COMPRISED OF THE QUERY PATTERN AND AT LEAST ONE INDEX TYPE AND PERFORMANCE INFORMATION RELATED TO THE AT LEAST ONE DATA PAIR

FIG. 6

INDEX SELECTION FOR DATABASE QUERY

BACKGROUND

The present invention relates generally to the field of database queries, and more particularly to index selection for database query.

A database is an organized collection of data, generally stored and accessed electronically from a computer system. A query against data in the database is quite frequent. After receiving a query, a query pattern is matched to the query by the database. The query is performed based on the query pattern and an index specified by the database.

SUMMARY

Embodiments of the present invention disclose a computer-implemented method, a computer program product, and a system. The computer-implemented method includes one or more computer processers matching a query pattern to a received query. The one or more computer processors obtain context information related to the received query. The one or more computer processors retrieve a set of query records including the same context information as the obtained context information from an index knowledge base, wherein each query record in the set of query records include context information related to a respective history query, the query pattern, an index type associated with the query pattern, and performance information relating to the query pattern and the index type. The one or more computer processors determine that a subset of the retrieved query records includes one or more query patterns equivalent to the matched query pattern. The one or more computer processors select a query pattern and an associated index type from the subset of query records based on associated performance information in the set of query records. The one or more computer processors perform the received query by applying the selected query pattern and the associated index type.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Implementation of embodiments of the invention may take a variety of forms, and exemplary implementation details are discussed subsequently with reference to the Figures.

The present invention will now be described in detail with reference to the Figures.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
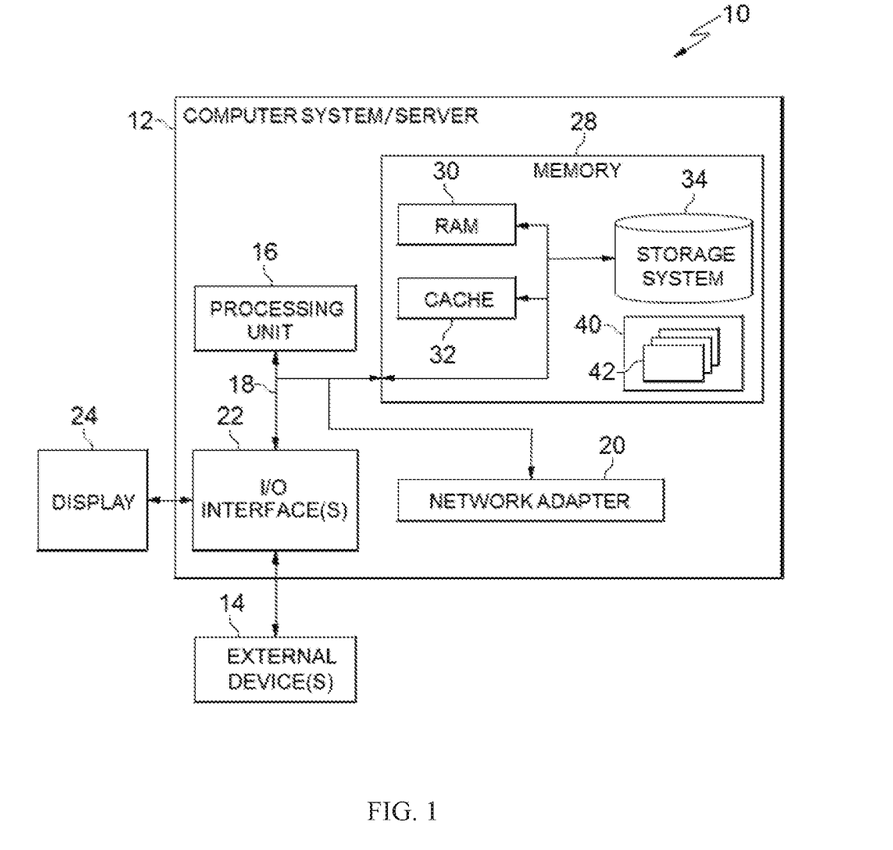
FIG. 1 depicts a cloud computing node, in accordance with an embodiment of the present invention.

FIG. 1 is a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more computer processors or processing units (i.e., processor 16), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. The present invention provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. The present invention enables the authorized and secure processing of user information, such as tracking information, as well as personal data, such as personally identifying information or sensitive personal information. The present invention provides information regarding the personal data and the nature (e.g., type, scope, purpose, duration, etc.) of the processing. The present invention provides the user with copies of stored personal data. The present invention allows the correction or completion of incorrect or incomplete personal data. The present invention allows the immediate deletion of personal data.

Figure 2:
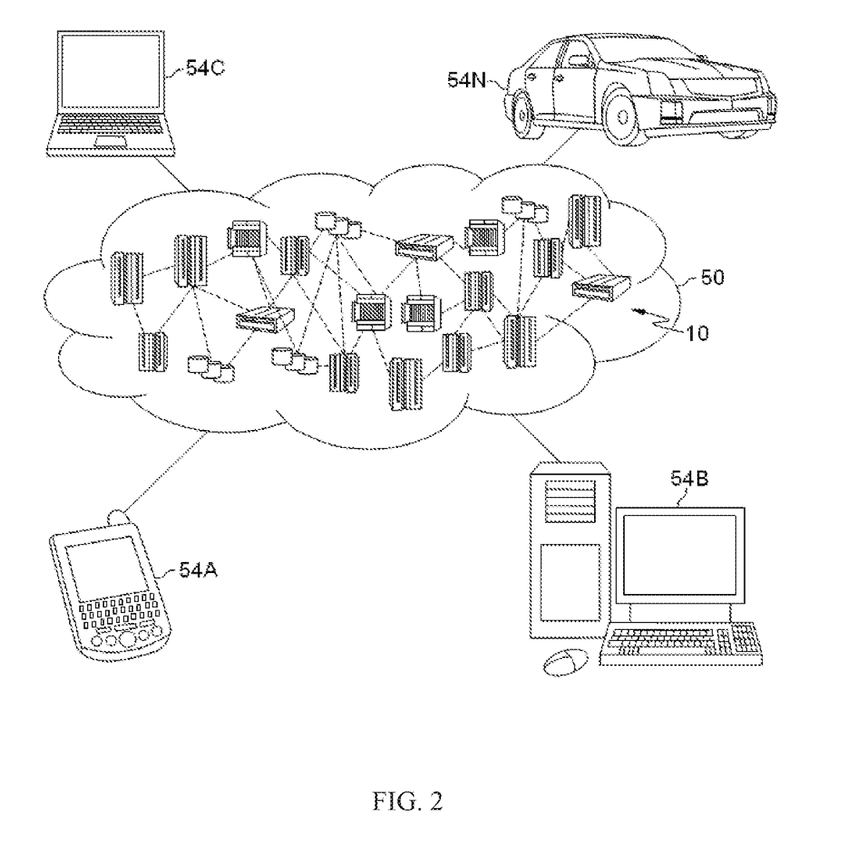
FIG. 2 depicts a cloud computing, in accordance with an embodiment of the present invention.

FIG. 2 depicts illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
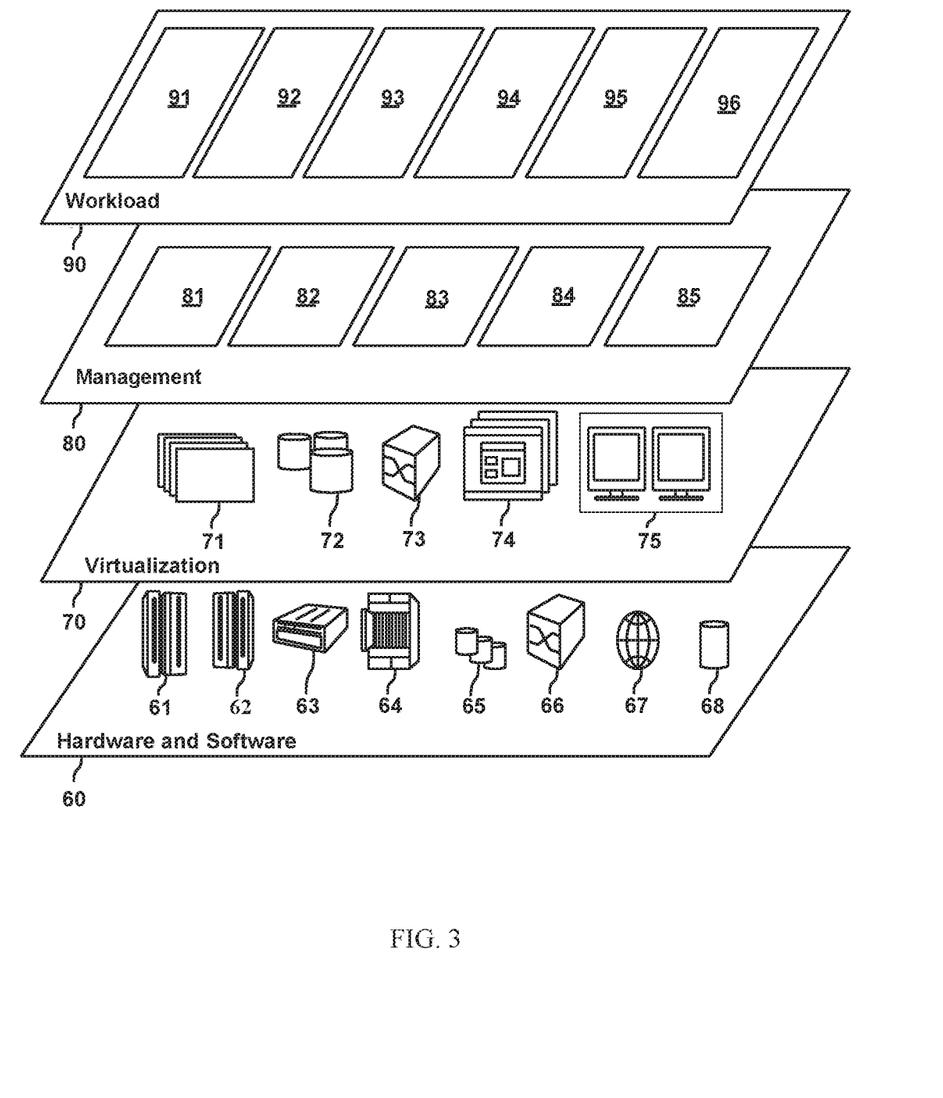
FIG. 3 depicts abstraction model layers, in accordance with an embodiment of the present invention.

FIG. 3 depicts a set of functional abstraction layers provided by cloud computing environment 50 (FIG. 2). It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database query 96.

There are multiple indexes built in the database such as B-tree, Hash, GiST, GIN, and BRIN. Each index type uses a different algorithm that is suited to different types of queries. Generally, an index type is specified to map with a query pattern according to user preference or default system settings. In these situations, it is not always efficient to perform a query. Performance of a query unexpectedly deteriorates due to an improper index type. Since the performance of the query is quite sensitive to a specific user, it is desirable to optimize index type to adapt to different query types to guarantee the performance of the query.

The embodiments of the present disclosure propose an index type selection mechanism for database query. Instead of specifying a fixed index type, different index types are selected to perform different kind of queries based on performance analysis for history quires. In this way, index type selection is optimized to ensure performance of the query.

Figure 4:
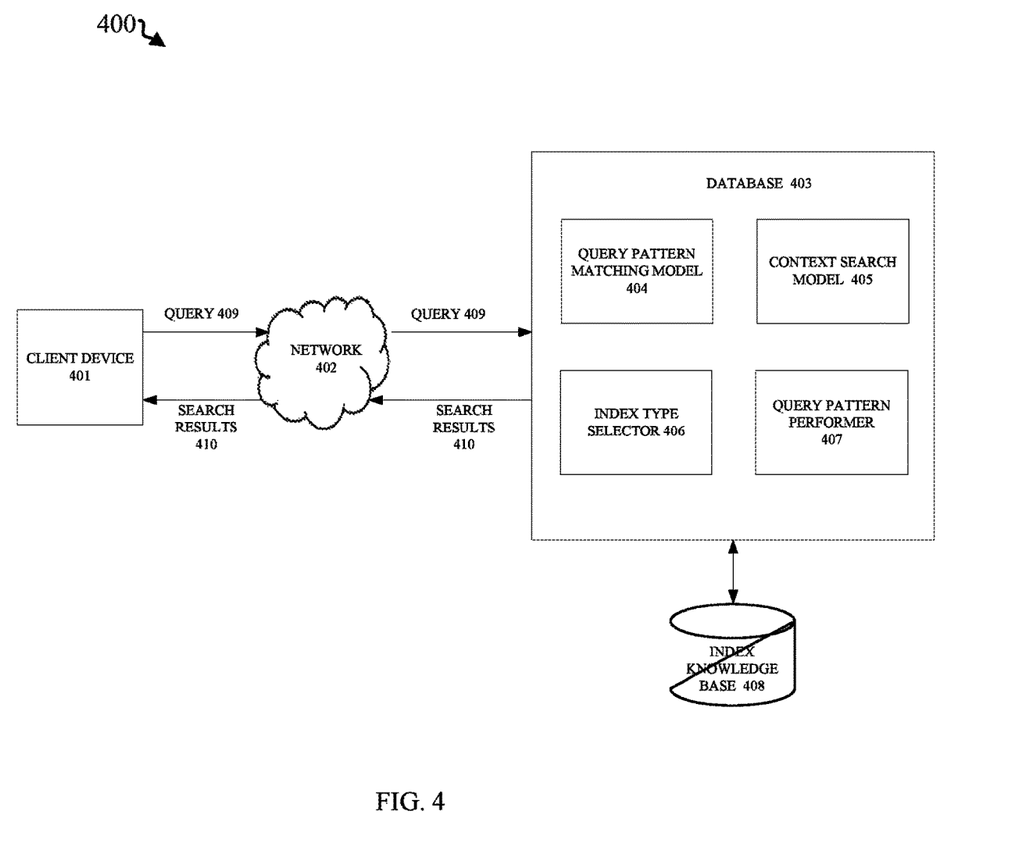
FIG. 4 depicts an example database query system, in accordance with an embodiment of the present invention.

FIG. 4 depicts database query system 400 which is an example database query system according to embodiments of the present disclosure is depicted. Database query system 400 includes client device 401, network 402, database system 403 and index knowledge base 408. A user can interact with database system 403 through client device 401. For example, client device 401 is a computer coupled to database system 403 via network 402. The user can submit query 409 to database system 403 through network 402. Database system 403 can respond to query 409 by generating search results 410, which are transmitted through network 402 to client device 401 in a form that can be presented to the user. Database system 403 includes query pattern matching module 404, context search model 405, index type selector 406 and query performer 407. In a nutshell, query pattern matching module 404 can match a query pattern to a received query such as query 409. Context search model 405 can search context information related to a query in index knowledge base 408. Index type selector 406 can select an index type for a received query such as query 409 from index knowledge base 408. Query performer 407 can perform a query using the selected index type.

Figure 5:
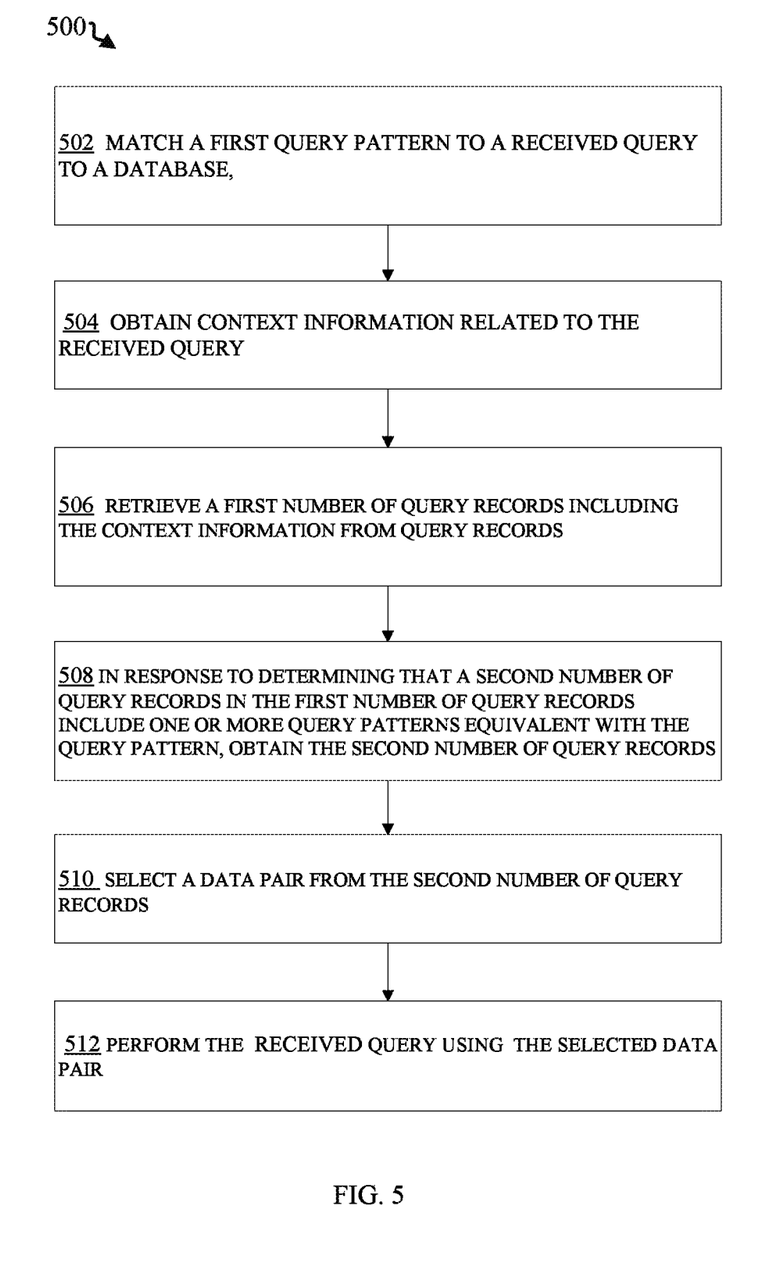
FIG. 5 depicts an example database query method, in accordance with an embodiment of the present invention.

FIG. 5 is an example database query method according to embodiments of the present disclosure is depicted. The method 500 can be implemented by database query system 400. The method 500 comprises steps 502-512.

Query pattern matching module 404, responsive to a query to a database, matches a query pattern to the received query (step 502).

A query pattern provides one or more predefined rules for matching and interpreting a query. In some embodiments, several query patterns are defined manually. In some embodiments, query patterns are manually generated by testing various ways of splitting different types of queries and scoring candidate query patterns based on search results. A particular score can be required to select a query pattern from candidate query patterns. A query pattern can include, for example, a language identifier (e.g., English), a country or domain (e.g., the United States), stopwords, a connector, a confidence value, and a query splits filter strategy.

In particular, as used in one or more embodiments of the present disclosure, "{what}" is a placeholder for one or more query terms identifying a thing, while "{where}" is a placeholder for one or more query terms identifying a location. For example, a query pattern has a form {what} at {where} which describes a query jointed by the term of the connector "at". Thus, the query pattern can be matched to a query of the form {what} at {where}, e.g., "Cafes at Fisherman's Wharf San Francisco". When the query pattern is matched, the query can be split at the connector into corresponding {what} and {where} query components. For example, for a query of the form {what} at {where}, the pattern is split into query components corresponding to {what} and {where}. Each of these portions can be separately searched, for example, according to specialized indexes (e.g., a geocoding index). Thus, for the query "Cafes at Fisherman's Wharf San Francisco" is split into "Cafes" and "Fisherman's Wharf San Francisco".

In an embodiment, query pattern matching module 404 annotates the query with particular labels that identify parts of the query. The labels are specified in accordance with the query pattern components, e.g., {prefix}, {suffix}, {query} and {connector}. Thus, the annotations are taken from the query pattern and matched to the corresponding query terms. For example, the query "Cafes at San Francisco square" can be annotated with the labels {what} {connector} {where} from the matching query pattern, where {what} is "Cafes", {connector} is "at", and {where} is "San Francisco". Here, the {where} portion of the query "Cafes at Fisherman's Wharf San Francisco" is also indicated by geographical coordinates "lat=37.808517&lon=−122.411934&radius=100". Therefore, a query can be explained with a plurality of query patterns. For the {where} part, the index type can be either attribute search or geospatial search etc.

Context search model 405 obtains context information related to the received query (step 504). According to one or more embodiments, the context information related to the received query may include at least one of: the number of queries that have been processed during a predefined time period before the received query such as query 409, index types corresponding to each of these queries, a source address of the received query, a query pattern matched to a previous query from the source address of the received query and search results of the previous query. Context search model 405 can obtain the context information related to the query from database system 403.

Context search model 405 retrieves a set of query records including the same context information as the obtained context information from an index knowledge base (step 506). Each of the set of query records include context information related to a respective history query, a query pattern, an index type associated with the query pattern, and performance information relating to the query pattern and the index type.

According to one or more embodiments, context search model 405 searches the context information in index knowledge base 408. Index knowledge base 408 includes a plurality of query records created based on information related to history queries. The information related to each of the history queries includes a query string of each history query, context information related to each history query, a query pattern matched to a respective history query, an index type associated with the query pattern and performance information relating to the query pattern and its associated the index type. The history query is performed by applying the query pattern and the associated index type. The information related to history queries can be obtained from database system 403. Similarly, context information related to each history query may include at least one of the number of queries that have been processed during a predefined time period before the received query, index types corresponding to each of the queries, a source address of the received query, a query pattern matched to a previous query from the source address of the received query, and search results of the previous query.

As noted above, query pattern matching module 404 can match a query pattern to each received query. Therefore, a query pattern matched to a respective history query can be obtained from query pattern matching module 404. An index type performing each history query can be obtained from index type selector 406. The performance information related to each history query such as a response time of the history query can be obtained from database system 403. By way of example, Table 1 records information related to history queries obtained from database system 403. Table 1 includes a plurality of entries, each of which corresponds to information related to a history query. By way of example, for history query A, query string A is a query string of history query A. Query pattern A is a matched query pattern of query string A. Context A is the context information related to history query A, index type A is selected to perform query A, and response time of query A is 1s.

TABLE 1

| Query String | Query Pattern | Context Information | Index Type | Performance |
|---|---|---|---|---|
| Query String A | Query Pattern A | context A | Index Type A | 1s |
| Query String B | Query Pattern B | context B | Index Type B | 2s |
| Query String C | Query Pattern C | context C | Index Type C | 1s |
| ... | ... | ... | ... | ... |

According to embodiments, index knowledge base 408 is built up based on information related to history queries. Index knowledge base 408 includes a plurality of query records. Each of the query records includes context information related to a history query and a data pair related to the history query and performance information related to the data pair. The data pair related to the history query is comprised of a query pattern and an index type related to the history query. According to embodiments, context information related to history queries and data pairs related to the history queries and performance information related to the data pairs can be obtained from the information related to the history queries to create a plurality of query records. A performance related to each data pair includes the performance of a history query when the history query is performed using a query pattern and an index type included in each data pair. The performance of a history query may be, for example, but is not limited to, response time of the query, CPU utilization for performing the query, memory utilization for performing the query and network utilization for performing the query, etc.

By way of example, Table 2 shows a part of query records in index knowledge base 408 built on information related to history queries in Table 1. Context A, the data pair (query pattern A, index type A), and the performance (1s) in the $1^{st}$ entry in Table 1 are extracted to create the $1^{st}$ query record in Table 2. Context B, the data pair (query pattern B, index type B), and the performance (2s) in the $2^{nd}$ entry in Table 1 are extracted to create the fourth query record in Table 2. Context C, the data pair (query pattern C, index type C), and the performance (1s) in the $3^{rd}$ entry in Table 1 are extracted to create the seventh entry in Table 2.

pairs (query pattern B, index type A), (query pattern B-1, index type B), and (query pattern B-2, index type A) have equivalent query patterns B, B-1, B-2. The performances related to the data pairs (query pattern B, index type A), (query pattern B-1, index type B) and (query pattern B-2, index type A) are 2s, 1s and 3s, respectively. Therefore, the performances for the data pairs (query pattern B-1, index type B), (query pattern B, index type A), and (query pattern B-2, index type A) are respectively ranked first, second and third. It means that, of the three data pairs, the performances related to data pair (query pattern B-1, index type B) is the best and the performances related to data pair (query pattern B-2, index type A) is the worst.

Although the performance related to a data pair in Table 1 and Table 2 is response time of a respective history query, it is only for purposes of illustration but is not intended to limit the embodiments disclosed. According to one or more embodiments, response time of a history query may combine with at least one of other performance measurements of the history query including CPU utilization for performing the history query, memory utilization for performing the history query and network utilization for performing the history query etc. The performance ranking store can be calculated as below:

$$L_{GAN}=E_{t1,t2} \sim P_{data}[\log(1-D(G(z,B_{t1},+(1-B_{t2})))] \quad (1)$$

with respect to equation (1), where $S_i$ represents a performance related to a data pair, $w_1$ represents a weight assigned to the performance related to the data pair, N represents the number of performances related to a data pair, $1 \le i \le N$ and $\Sigma_1^N w_i = 1$.

TABLE 2

| ID | Query Pattern | Context Information | Index Type | Performance | Performance Ranking Score |
|---|---|---|---|---|---|
| ID1 | Query Pattern A | Context A | Index Type A | 1s | 1 |
| ID1 | Query Pattern A | Context A | Index Type B | 2s | 2 |
| ID1 | Query Pattern A-1 | Context A | Index Type A | 3s | 3 |
| ID2 | Query Pattern B | Context B | Index Type A | 2s | 2 |
| ID2 | Query Pattern B-1 | Context B | Index Type B | 1s | 1 |
| ID2 | Query Pattern B-2 | Context B | Index Type A | 3s | 3 |
| ID3 | Query Pattern C | Context C | Index Type C | 3s | 3 |
| ID3 | Query Pattern C-1 | Context C | Index Type A | 2s | 2 |
| ID3 | Query Pattern C-2 | Context C | Index Type B | 1s | 1 |

According to one or more embodiments, an identification (TD) is assigned to each query pattern. Equivalent query patterns share a same TD which signifies that an ID can uniquely identify equivalent query patterns. For example, in Table 2, ID1 can be used to uniquely identify equivalent query patterns A, A-1. ID 2 can be used to uniquely identify equivalent query patterns B, B-1, B-2. ID 3 can be used to uniquely identify equivalent query patterns C, C-1, C-2.

According to one embodiment, a performance ranking is added to each query record in index knowledge base 408, which is provided based on performances related to data pairs having equivalent query patterns. For example, data Those of ordinary skill in the art may understand that, the query records in Table 2 are only for purposes of illustration but is not intended to limit the embodiments disclosed. There are many solutions to record the query records in index knowledge base 408, for example, the query records are created in a form of a file such as XML file or other data structures. Index knowledge base 408 can be updated every period of time (e.g., one month).

According to some embodiments, data pairs obtained from the information related to history queries can be further expended to create more query records to enrich index knowledge base 408.

In step 508, the present invention determines a subset of the retrieved query records includes one or more query patterns equivalent to the matched query pattern. According to some embodiments, index type selector 406 obtains IDs of respective query patterns in the retrieved query records from database system 403. Index type selector 406 can further obtain an ID of the matched query pattern of the received query from database system 403. Index type selector 406 can determine whether each of the IDs of respective query patterns in the retrieved query records is the same as that of the matched query pattern of the received query. As cited above, equivalent query patterns can be identified by an ID. In the scenario where a plurality of query patterns share a same ID number, this signifies that the plurality of query patterns are equivalent patterns. Index type selector 406 can make a comparison between each of the IDs of query patterns in the retrieved query records and that of the matched query pattern of the received query. In response to a determination that at least one ID is the same as that of the matched query pattern of the received query, index type selector 406 can determine a subset of the retrieved query records that include one or more query patterns equivalent to the matched query pattern.

The present invention selects a query pattern and its associated index type from the subset of query records based on performance information in the set of query records (step 510). By way of example, it is assumed that context information related to the received query is context A and the query pattern of the received query is query pattern A-1 with ID1. Using context A as key words, the three query records including data pairs (query pattern A, index type A), (query pattern A, index type B), and (query pattern A-1, index type A) can be retrieved from index knowledge base 408. By comparing ID1 and each ID of query patterns of the three data pairs, it is found that the query patterns of the three data pairs are equivalent with the query pattern of the received query. According to the three query records, the performance related to the data pair (query pattern A, index type A) is ranked the first therefore, query pattern A and index type A are selected from the three query records.

Query performer 407 performs the received query by applying the selected query pattern and its associated index type (step 512). According to one embodiment, the selected query pattern and its associated index type includes the matched query pattern to the received query and a first index type. Query pattern performer 407 can perform the query by applying the matched query pattern and the first index type. According to one embodiment, the selected query pattern and its associated index includes a second query pattern equivalent to the matched query pattern and a second index type. Query performer 407 can perform the received query by applying the second query pattern and the second index type.

According to the present disclosure, instead of performing the query pattern and an index type specified by database system 403, query performer 407 can perform the query using a query pattern and an index type in the selected data pair. Because the data pair is selected according to its performance information related to the data pair, the performance of the query can be guaranteed.

Figure 6:
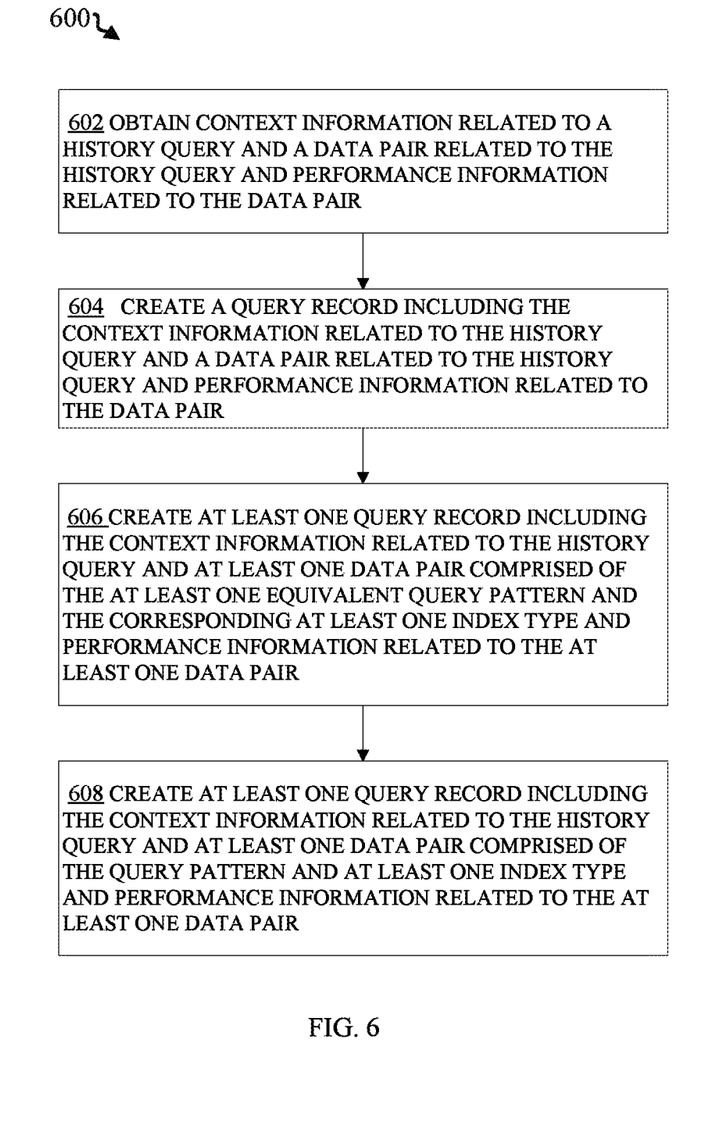
FIG. 6 depicts an example query records creation method, in accordance with an embodiment of the present invention.

FIG. 6 depicts an example query records creation method according to embodiments of the present disclosure is depicted. According to embodiments of the present disclosure, the query records in index knowledge base 408 are divided into a plurality of groups. Each of the plurality of groups can be created by method 600. Method 600 comprises steps 602 to 608 which can be implemented by database system 403.

Database system 403 obtains context information related to a history query, a data pair related to the history query, and performance information related to the data pair (step 602).

Database system 403 creates a query record including the context information related to the history query, the data pair related to the history query, and performance information related to the data pair (step 604).

Database system 403, responsive to a determination that a query pattern of the data pair related to the history query has at least one equivalent query pattern corresponding to at least one index type, creates at least one query record including the context information related to the history query and at least one data pair comprised of the at least one equivalent query pattern and the corresponding at least one index type and performance information related to the at least one data pair (step 606).

As noted above, a query can be explained with a plurality of query patterns (i.e., equivalent query patterns of the query). Each of the equivalent query patterns can be supported by at least one index type. By way of example, in Table 2, query pattern A is a matched query pattern of query A. Query pattern A can be converted into query pattern A-1. Therefore, query pattern A and query pattern A-1 are equivalent query patterns. Query pattern A-1 can be supported by index type A. By designing a test instance meeting context A, a performance test of query A can be conducted using query pattern A-1 and index type A. As result, performance of query A such as response time can be obtained by executing the test instance on database system 403. In this way, a new query record including context A, the data pair (query pattern A-1, index type A) and performance related to the data pair can be created. The new query record corresponds to the $3^{rd}$ entry in Table 2.

Database system 403, responsive to a determination that a query pattern of the data pair related to the history query corresponds to at least one index type other than an index type in the data pair related to the history query, creates at least one query record including the context information related to the history query, at least one data pair comprised of the query pattern and at least one index type, and performance information related to the at least one data pair (step 608).

As known, a query pattern can be supported by at least one index type. Different index type can provide different performance for a query. By way of example, for query A in Table 1, besides index type A, index type B can support query pattern A. Designing a test instance in accordance with context A, performance test of query A can be conducted using query pattern A and index type B. Therefore, performance of query A, such as response time, can be obtained by executing the test instance on database system 403. In this way, a new query record including context A, the data pair (query pattern A, index type B) and performance related to the data pair can be created. A new entry including the data pair (query pattern A, index type B) corresponding to context A and performance of the data pair can be generated and added to Table 2. The new query record corresponds to the 2nd entry in Table 2.

Therefore, based on the information related to history queries, more data pairs are expanded, and more query records are created in index knowledge base 408. The performance related to these expanded data pairs can be acquired through executing designed test instances to meet specific context information.

According to some embodiments, index knowledge base 408 is stored in a storage separated from database system 403. The information related to history queries can be stored either in database system 403 or in index knowledge base 408. By way of example, after obtaining the context information of query 409, a set of query records including the same context information as the obtained context information in step 504 can be retrieved from query records in index knowledge base 408 by context search model 405.

It should be noted that the database query method according to embodiments of this disclosure could be implemented by computer system/server 12 of FIG. 1.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
matching, by one or more computer processors, a query pattern to a received query;
obtaining, by one or more computer processors, context information related to the received query;
retrieving, by one or more computer processors, a set of query records including the same context information as the obtained context information from an index knowledge base, wherein each query record in the set of query records includes context information related to a respective history query, the query pattern, an index type associated with the query pattern, and performance information relating to the query pattern and the index type, wherein the index type maps to an indexing algorithm applied to the index knowledge base according to user preference and default system settings while performance of the received query deteriorates due to an improper index type, wherein the indexing algorithm comprises at least one of the following: B-tree, GiST, GIN, and BRIN;
determining, by one or more computer processors, a subset of the retrieved query records includes one or more query patterns equivalent to the matched query pattern;
selecting, by one or more computer processors, the query pattern and an associated index type from the subset of query records based on associated performance information in the set of query records; and
performing, by one or more computer processors, the received query by applying the selected query pattern and the associated index type.

2. The computer-implemented method of claim 1, wherein the query records in the index knowledge base have a plurality of groups, and each group in the plurality of groups is created by actions comprising:
obtaining, by one or more computer processors, context information related to a history query and a data pair related to the history query and performance information related to the data pair, the data pair being comprised of the query pattern, and the associated index type;
creating, by one or more computer processors, a query record including the context information related to the history query and a data pair related to the history query and performance information related to the data pair; and
responsive to a determination that the query pattern of the data pair related to the history query has at least one equivalent query pattern corresponding to at least one index type, creating, by one or more computer processors, at least one query record including the context information related to the history query and at least one data pair comprised of the at least one equivalent query pattern, at least one associated index type, and performance information related to the at least one data pair.

3. The computer-implemented method of claim 2, wherein each group in the plurality of groups is created by actions comprising:
responsive to a determination that the query pattern of the data pair related to the history query is associated with at least one index type other than an index type in the data pair related to the history query, creating, by one or more computer processors, at least one query record that includes the context information related to the history query and at least one data pair comprised of the query pattern and its associated at least one index type.

4. The computer-implemented method of claim 1, wherein the context information related to the received query comprises one or more number of queries that have been processed during a predefined time period before the received query, index types corresponding to each of the queries, a source address of the received query, a query pattern matched to a previous query from the source address of the received query, and search results of the previous query.

5. The computer-implemented method of claim 2, further comprising:
assigning, by one or more computer processors, an identification (ID) to each query pattern in the index knowledge base, wherein equivalent query patterns share a same ID.

6. The computer-implemented method of claim 5, wherein the determining that the subset of the retrieved query records includes one or more query patterns equivalent to the matched query pattern further comprises:
obtaining, by one or more computer processors, one or more IDs of query patterns in the retrieved query records and an ID of the matched query pattern of the received query;
determining, by one or more computer processors, whether each of the obtained IDs is same as that of the query pattern of the received query; and
responsive to a determination that at least one ID is the same as that of the matched query pattern of the received query, determining, by one or more computer processors, that the subset of the retrieved query records include one or more query patterns equivalent to the matched query pattern.

7. The computer-implemented method of claim 1, wherein the selected query pattern and the associated index type includes the matched query pattern, a first index type, and the performing the received query includes performing the received query by applying the matched query pattern and the first index type.

8. The computer-implemented method of claim 1, wherein the selected query pattern and the associated index type includes a second query pattern equivalent to the matched query pattern and a second index type, and the performing the received query includes performing the received query by applying the second query pattern and the second index type.

9. A computer program product comprising:
one or more computer readable storage media and program instructions stored on the one or more computer readable storage media, the stored program instructions comprising:
program instructions to match a query pattern to a received query;
program instructions to obtain context information related to the received query;
program instructions to retrieve a set of query records including the same context information as the obtained context information from an index knowledge base, wherein each query record in the set of query records includes context information related to a respective history query, the query pattern, an index type associated with the query pattern, and performance information relating to the query pattern and the index type, wherein the index type maps to an indexing algorithm applied to the index knowledge base according to user preference and default system settings while performance of the received query deteriorates due to an improper index type, wherein the indexing algorithm comprises at least one of the following: B-tree, GiST, GIN, and BRIN;
program instructions to determine a subset of the retrieved query records includes one or more query patterns equivalent to the matched query pattern;
program instructions to select the query pattern and an associated index type from the subset of query records based on associated performance information in the set of query records; and
program instructions to perform the received query by applying the selected query pattern and the associated index type.

10. The computer program product of claim 9, wherein the query records in the index knowledge base have a plurality of groups, and each group in the plurality of groups is created by actions comprising:
program instructions to obtain context information related to a history query and a data pair related to the history query and performance information related to the data pair, the data pair being comprised of the query pattern, and the associated index type;
program instructions to create a query record including the context information related to the history query and a data pair related to the history query and performance information related to the data pair; and
program instructions to, responsive to a determination that the query pattern of the data pair related to the history query has at least one equivalent query pattern corresponding to at least one index type, create at least one query record including the context information related to the history query and at least one data pair comprised of the at least one equivalent query pattern, at least one associated index type, and performance information related to the at least one data pair.

11. The computer program product of claim 9, wherein the context information related to the received query comprises one or more number of queries that have been processed during a predefined time period before the received query, index types corresponding to each of the queries, a source address of the received query, a query pattern matched to a previous query from the source address of the received query, and search results of the previous query.

12. The computer program product of claim 10, wherein the program instructions, stored on the one or more computer readable storage media, further comprise:
program instructions to assign an identification (ID) to each query pattern in the index knowledge base, wherein equivalent query patterns share a same ID.

13. The computer program product of claim 12, wherein the program instructions, to determine that the subset of the retrieved query records includes one or more query patterns equivalent to the matched query pattern, comprise:
program instructions to obtain one or more IDs of query patterns in the retrieved query records and an ID of the matched query pattern of the received query;
program instructions to determine whether each of the obtained IDs is same as that of the query pattern of the received query; and
program instructions to, responsive to a determination that at least one ID is the same as that of the matched query pattern of the received query, determine that the subset of the retrieved query records include one or more query patterns equivalent to the matched query pattern.

14. The computer program product of claim 9, wherein the selected query pattern and the associated index type includes the matched query pattern, a first index type, and the program instructions to perform the received query includes program instructions to perform the received query by applying the matched query pattern and the first index type.

15. The computer program product of claim 9, wherein the selected query pattern and the associated index type includes a second query pattern equivalent to the matched query pattern and a second index type, and program instructions to perform the received query includes program instructions to perform the received query by applying the second query pattern and the second index type.

16. A computer system comprising:
one or more computer processors;
one or more computer readable storage media; and
program instructions stored on the computer readable storage media for execution by at least one of the one or more processors, the stored program instructions comprising:
program instructions to match a query pattern to a received query;
program instructions to obtain context information related to the received query;
program instructions to retrieve a set of query records including the same context information as the obtained context information from an index knowledge base, wherein each query record in the set of query records includes context information related to a respective history query, the query pattern, an index type associated with the query pattern, and performance information relating to the query pattern and the index type, wherein the index type maps to an indexing algorithm applied to the index knowledge base according to user preference and default system settings while performance of the received query deteriorates due to an improper index type, wherein the indexing algorithm comprises at least one of the following: B-tree, GiST, GIN, and BRIN;

program instructions to determine a subset of the retrieved query records includes one or more query patterns equivalent to the matched query pattern;

program instructions to select the query pattern and an associated index type from the subset of query records based on associated performance information in the set of query records; and program instructions to perform the received query by applying the selected query pattern and the associated index type.

17. The computer system of claim 16, wherein the query records in the index knowledge base have a plurality of groups, and each group in the plurality of groups is created by actions comprising:

program instructions to obtain context information related to a history query and a data pair related to the history query and performance information related to the data pair, the data pair being comprised of the query pattern, and the associated index type;

program instructions to create a query record including the context information related to the history query and a data pair related to the history query and performance information related to the data pair; and program instructions to, responsive to a determination that the query pattern of the data pair related to the history query has at least one equivalent query pattern corresponding to at least one index type, create at least one query record including the context information related to the history query and at least one data pair comprised of the at least one equivalent query pattern, at least one associated index type, and performance information related to the at least one data pair.

18. The computer system of claim 16, wherein the context information related to the received query comprises one or more number of queries that have been processed during a predefined time period before the received query, index types corresponding to each of the queries, a source address of the received query, a query pattern matched to a previous query from the source address of the received query, and search results of the previous query.

19. The computer system of claim 17, wherein the program instructions, stored on the one or more computer readable storage media, further comprise:

program instructions to assign an identification (ID) to each query pattern in the index knowledge base, wherein equivalent query patterns share a same ID.

20. The computer system of claim 19, wherein the program instructions, to determine that the subset of the retrieved query records includes one or more query patterns equivalent to the matched query pattern, comprise:

program instructions to obtain one or more IDs of query patterns in the retrieved query records and an ID of the matched query pattern of the received query;

program instructions to determine whether each of the obtained IDs is same as that of the query pattern of the received query; and program instructions to, responsive to a determination that at least one ID is the same as that of the matched query pattern of the received query, determine that the subset of the retrieved query records include one or more query patterns equivalent to the matched query pattern.

\* \* \* \* \*